US012586065B2

(12) United States Patent
Suh et al.

(10) Patent No.: US 12,586,065 B2
(45) Date of Patent: Mar. 24, 2026

(54) CRYPTOCURRENCY TRANSACTION FUND FLOW ANALYSIS METHOD AND SYSTEM

(71) Applicant: S2W INC., Seongnam-si (KR)

(72) Inventors: Sang Duk Suh, Gyeonggi-do (KR); Chang Hoon Yoon, Gyeonggi-do (KR); Seung Hyeon Lee, Daejeon (KR)

(73) Assignee: S2W LAB INC., Seongnam-si (KR)

( * ) Notice: Subject to any disclaimer, the term of this patent is extended or adjusted under 35 U.S.C. 154(b) by 478 days.

(21) Appl. No.: 17/424,828

(22) PCT Filed: Jan. 20, 2020

(86) PCT No.: PCT/KR2020/000951
§ 371 (c)(1),
(2) Date: Jul. 21, 2021

(87) PCT Pub. No.: WO2020/153688
PCT Pub. Date: Jul. 30, 2020

(65) Prior Publication Data
US 2022/0027900 A1      Jan. 27, 2022

(30) Foreign Application Priority Data

Jan. 22, 2019     (KR) ........................ 10-2019-0007814

(51) Int. Cl.
*G06Q 20/38* (2012.01)
*G06F 16/27* (2019.01)
*G06Q 20/40* (2012.01)

(52) U.S. Cl.
CPC .......... *G06Q 20/389* (2013.01); *G06F 16/27* (2019.01); *G06Q 20/3829* (2013.01); *G06Q 20/4014* (2013.01); *G06Q 20/4016* (2013.01)

(58) Field of Classification Search
None
See application file for complete search history.

(56) References Cited

U.S. PATENT DOCUMENTS

| | | | | |
|---|---|---|---|---|
| 10,269,009 B1 * | 4/2019 | Winklevoss | ......... | G06Q 20/105 |
| 10,354,325 B1 * | 7/2019 | Skala | ..................... | G06Q 40/04 |

(Continued)

FOREIGN PATENT DOCUMENTS

| | | | | |
|---|---|---|---|---|
| AU | 2022359249 A1 * | 1/2024 | ............. | G06Q 30/04 |
| CA | 3061638 A1 * | 11/2018 | ............. | G06F 21/00 |

(Continued)

OTHER PUBLICATIONS

Fernández-Caramé et al., A Review on the Use of Blockchain for the Internet of Things. IEEE Open Access Journal, vol. 6, 2018. https://ieeexplore.ieee.org/stamp/stamp.jsp?arnumber=8370027 (Year: 2018).*

(Continued)

*Primary Examiner* — El Mehdi Oussir
(74) *Attorney, Agent, or Firm* — Sughrue Mion, PLLC

(57) ABSTRACT

The present application relates to analyzing a transaction flow of cryptocurrency. A method may include collecting distributed ledger information of a blockchain corresponding to a specific cryptocurrency and standardizing blockchain data extracted from the distributed ledger information, collecting and standardizing multitype data related to the cryptocurrency transaction, constructing a cryptocurrency network graph using the standardized blockchain data, constructing a knowledge graph using the standardized multitype data, mapping the cryptocurrency network graph and the knowledge graph to generate a multi-layer based transaction analysis knowledge graph, searching for transaction information using a first cryptocurrency address for which a fund flow is to be tracked as an input address in the transaction analysis knowledge graph, generating a fund flow graph having the input address and an output address as nodes to track a fund flow, and identifying an attribute of (Continued)

each node included in the fund flow graph using the knowledge graph.

17 Claims, 12 Drawing Sheets

(56) References Cited

U.S. PATENT DOCUMENTS

| | | | | |
|---|---|---|---|---|
| 10,373,129 | B1 * | 8/2019 | James | H04L 9/06 |
| 10,438,290 | B1 * | 10/2019 | Winklevoss | G06F 16/1815 |
| 10,546,296 | B2 * | 1/2020 | Narasimhan | H04L 63/08 |
| 10,832,214 | B1 * | 11/2020 | Leise | G06F 21/64 |
| 10,915,891 | B1 * | 2/2021 | Winklevoss | H04L 9/3255 |
| 10,929,842 | B1 * | 2/2021 | Arvanaghi | H04L 9/3239 |
| 11,188,907 | B1 * | 11/2021 | Vijayvergia | G06Q 20/023 |
| 11,282,139 | B1 * | 3/2022 | Winklevoss | G06Q 40/04 |
| 11,861,619 | B1 * | 1/2024 | Vijayaraghavan | G06Q 20/389 |
| 12,026,789 | B2 * | 7/2024 | Jevans | G06Q 20/36 |
| 12,169,868 | B2 * | 12/2024 | Navarro | G06Q 20/405 |
| 2005/0182708 | A1 | 8/2005 | Moudgal | |
| 2014/0172745 | A1 | 6/2014 | Posch | |
| 2015/0347480 | A1 | 12/2015 | Smart | |
| 2016/0012465 | A1 * | 1/2016 | Sharp | G06Q 20/321 |
| | | | | 705/14.17 |
| 2016/0098723 | A1 * | 4/2016 | Feeney | G06Q 20/065 |
| | | | | 705/75 |
| 2016/0098730 | A1 * | 4/2016 | Feeney | G06Q 20/20 |
| | | | | 705/71 |
| 2016/0253663 | A1 * | 9/2016 | Clark | G06Q 20/341 |
| | | | | 705/75 |
| 2017/0046689 | A1 * | 2/2017 | Lohe | G06Q 20/384 |
| 2017/0048209 | A1 * | 2/2017 | Lohe | G06Q 20/3829 |
| 2017/0048234 | A1 * | 2/2017 | Lohe | H04L 63/0807 |
| 2017/0048235 | A1 * | 2/2017 | Lohe | G06Q 50/01 |
| 2017/0083907 | A1 * | 3/2017 | McDonough | G06Q 20/3825 |
| 2017/0085545 | A1 * | 3/2017 | Lohe | G06Q 20/10 |
| 2017/0085555 | A1 * | 3/2017 | Bisikalo | G06Q 20/10 |
| 2017/0091756 | A1 * | 3/2017 | Stern | G06Q 20/36 |
| 2017/0109735 | A1 * | 4/2017 | Sheng | G06Q 20/3678 |
| 2017/0221052 | A1 * | 8/2017 | Sheng | H04L 9/14 |
| 2017/0232300 | A1 * | 8/2017 | Tran | G06F 1/163 |
| | | | | 434/247 |
| 2017/0366516 | A1 | 12/2017 | Pattanaik | |
| 2018/0005186 | A1 * | 1/2018 | Hunn | G06F 16/219 |
| 2018/0101779 | A1 | 4/2018 | Canim | |
| 2018/0101906 | A1 * | 4/2018 | Mcdonald | G06Q 20/204 |
| 2018/0183600 | A1 * | 6/2018 | Davis | G06F 16/951 |
| 2018/0191503 | A1 * | 7/2018 | Alwar | H04L 9/3242 |
| 2018/0316665 | A1 | 11/2018 | Caldera | |
| 2019/0180275 | A1 * | 6/2019 | Safak | H04L 9/3247 |
| 2019/0205894 | A1 * | 7/2019 | Gonzales, Jr. | H04L 9/3247 |
| 2019/0340584 | A1 * | 11/2019 | Arora | G06Q 20/3829 |
| 2019/0349426 | A1 * | 11/2019 | Smith | H04L 41/0806 |
| 2020/0042988 | A1 * | 2/2020 | Snow | G06Q 20/381 |
| 2020/0184278 | A1 * | 6/2020 | Zadeh | G06N 3/044 |
| 2020/0394709 | A1 * | 12/2020 | Cella | G06F 18/23 |
| 2021/0133888 | A1 * | 5/2021 | Leise | G06F 16/9024 |
| 2021/0157312 | A1 * | 5/2021 | Cella | G01M 13/045 |
| 2021/0350289 | A1 * | 11/2021 | Augustine | H04L 9/3239 |
| 2021/0383379 | A1 * | 12/2021 | Choi | G06Q 20/065 |
| 2022/0121884 | A1 * | 4/2022 | Zadeh | G06N 3/006 |
| 2022/0318775 | A1 * | 10/2022 | Tomkins | G06N 20/00 |

| | | | | |
|---|---|---|---|---|
| 2022/0391859 | A1 * | 12/2022 | McGregor | G06Q 20/3827 |
| 2024/0161108 | A1 * | 5/2024 | Madisetti | H04L 9/3213 |
| 2025/0156828 | A1 * | 5/2025 | Sliwka | H04L 9/3247 |

FOREIGN PATENT DOCUMENTS

| | | | | | |
|---|---|---|---|---|---|
| CA | 3040791 | C | * | 12/2020 | G06F 21/602 |
| CA | 2938754 | C | * | 6/2021 | G06F 21/62 |
| CN | 103843024 | A | * | 6/2014 | G02B 27/017 |
| CN | 109063138 | A | * | 12/2018 | G06F 21/602 |
| CN | 110033369 | A | * | 7/2019 | G06Q 20/065 |
| CN | 110073394 | A | * | 7/2019 | G06Q 30/0185 |
| CN | 106651331 | B | * | 11/2019 | |
| CN | 111316258 | A | * | 6/2020 | G06F 16/27 |
| CN | 111383004 | A | * | 7/2020 | |
| CN | 108805656 | B | * | 1/2021 | G06Q 30/0605 |
| CN | 107145768 | B | * | 2/2021 | G06F 21/10 |
| CN | 108009811 | B | * | 6/2021 | G06Q 20/085 |
| CN | 107851281 | B | * | 7/2021 | G06Q 20/027 |
| JP | 2020-503784 | A | | 1/2020 | |
| KR | 102074074 | B1 | * | 2/2020 | G06Q 20/382 |
| KR | 20240010457 | A | * | 4/2022 | |
| KR | 20240019771 | A | * | 5/2022 | |
| WO | WO-2017011601 | A1 | * | 1/2017 | G06F 12/1408 |
| WO | WO-2017112664 | A1 | * | 6/2017 | G06Q 20/389 |
| WO | WO-2018032890 | A1 | * | 2/2018 | G06F 16/1834 |
| WO | WO 2018/217804 | | | 11/2018 | |

OTHER PUBLICATIONS

Bohme et al. Bitcoin: Economics, Technology, and Governance. Journal of Economic Perspectives, V. 29, No. 2. https://pubs.aeaweb.org/doi/pdf/10.1257/jep.29.2.213?utm_source=dlvr.it&utm_medium=twitter& (Year: 2015).*

Goldfeder et al. When the cookie meets the blockchain: Privacy risks of web payments via cryptocurrencies. Proceedings on Privacy Enhancing Technologies ; 2018 (4):179-199. https://petsymposium.org/popets/2018/popets-2018-0038.pdf (Year: 2018).*

Yousaf et al. Tracing Transactions Across Cryptocurrency Ledgers. 28th USENIX Security Symposium Aug. 14-16, 2019, Santa Clara, CA. https://www.usenix.org/system/files/sec19-yousaf_0.pdf (Year: 2019).*

D. Pavithran and R. Thomas, "A Survey on Analyzing Bitcoin Transactions," 2018 Fifth HCT Information Technology Trends (ITT), Dubai, United Arab Emirates, 2018, pp. 227-231. https://ieeexplore.ieee.org/document/8649517?source=IQplus (Year: 2018).*

M. Bartoletti, B. Pes and S. Serusi, "Data Mining for Detecting Bitcoin Ponzi Schemes," 2018 Crypto Valley Conference on Blockchain Technology (CVCBT), Zug, Switzerland, 2018, pp. 75-84, https://ieeexplore.ieee.org/document/8525395?source=IQplus (Year: 2018).*

Financial Services Agency, Mitsubishi Research Institute, Inc.; Mar. 20, 2019; pp. 194-210; 30 pages with English Abstract.

Office Action dated Oct. 28, 2022 for JP App. No. 2021-539150, with English translation, 6 pages.

International Search Report & Written Opinion for PCT/KR/2020/000951 as prepared by the Korean International Searching Authority mailed on May 8, 2020, 2 pages.

Jo, Jung-hwan. "[Inside Blockchain Tech] Chainalysis, Darknet's sniper 'reactor' technology". Translated from Internet article, with publication date Apr. 5, 2018. 6 pgs.

* cited by examiner

CRYPTOCURRENCY TRANSACTION FUND FLOW ANALYSIS METHOD AND SYSTEM

CROSS-REFERENCE TO RELATED APPLICATIONS

This application claims priority to and is a 35 U.S.C. § 371 national phase application of PCT/KR2020/000951 (WO2020/153688), filed on Jan. 20, 2020, entitled "Method and System for Analyzing Cryptocurrency Transaction" which application claims priority to and the benefit of Korean Patent Application No. 10-2019-0007814, filed Jan. 22, 2019, the disclosures of which are incorporated herein by reference in their entirety.

TECHNICAL FIELD

The present invention relates to a method and system for analyzing a cryptocurrency transaction, and more specifically relates to a method and system for analyzing and processing cryptocurrency data using an attribute of cryptocurrency to allow analysis of a transaction flow of cryptocurrency that has been difficult to grasp in the past.

BACKGROUND ART

Cryptocurrency is a digital asset designed to function as means of exchange, and refers to electronic information that is encrypted with blockchain technology, distributed and issued, and can be used as currency in a certain network. Cryptocurrency is not issued by the central bank, is electronic information whose monetary value is digitally displayed based on blockchain technology, is distributed and stored in a P2P method on the Internet, and is operated and managed. The core technique for issuing and managing cryptocurrency is blockchain technology. Blockchain is a list of continuously increasing records (blocks), and blocks are connected using an encryption method to ensure security. Each block typically contains cryptographic hash of a previous block, timestamp, and transaction data. Blockchain is an open decentralized ledger that is resistant to data modification from the outset and can effectively and permanently prove the transaction between both parties. Therefore, cryptocurrency enables transparent operation based on tamper protection.

In addition, unlike existing currencies, cryptocurrency has anonymity, and thus a third party other than a giving person and a receiving person cannot know transaction details at all. Due to the anonymity of the account, it is difficult to track the flow of transactions (non-trackable), and while all records such as remittance records and collection records are all public, a subject of the transaction is unknown (pseudonymity).

Cryptocurrency is regarded as an alternative to the existing key currency due to the above-described freedom and transparency, and is expected to be effectively used for international transactions with lower fees and simple remittance procedures compared to existing currencies. However, due to the anonymity, cryptocurrency is sometimes abused as criminal means, such as being used for illegal transactions.

Therefore, when cryptocurrency is used as criminal means, or when it is necessary to identify a subject of a transaction, a method for grasping and analyzing is required.

SUMMARY OF INVENTION

Technical Problem

An object of the present invention is to solve the above-described problems, and an object thereof is to provide a method for analyzing cryptocurrency transactions and identifying a transaction subject.

In addition, another object of the present invention is to minimize the use of cryptocurrency as a tool to support illegal activities by detecting illegal transactions using cryptocurrency and learning transaction patterns.

Solution to Problem

To achieve such an object, the present invention is a method of analyzing a cryptocurrency transaction by an electronic device and is characterized by including a blockchain management step of collecting distributed ledger information of a blockchain corresponding to a specific cryptocurrency and standardizing blockchain data extracted from the distributed ledger information, a multi-type data management step of collecting and standardizing multi-type data related to the cryptocurrency transaction on a Web, a graph generation step of constructing a cryptocurrency network graph using the standardized blockchain data, constructing a knowledge graph using the standardized multi-type data, and mapping the cryptocurrency network graph and the knowledge graph to generate a multi-layer based transaction analysis knowledge graph, and a graph analysis step of searching for transaction information using a first cryptocurrency address for which a fund flow is to be tracked as an input address in the transaction analysis knowledge graph, generating a fund flow graph having the input address and an output address as nodes to track a fund flow, and identifying an attribute of each node included in the fund flow graph using the knowledge graph. According to the present invention, it is possible to analyze a transaction flow of cryptocurrency and identify a transaction subject.

In addition, the present invention is a cryptocurrency transaction analysis system, and is characterized by including a blockchain management unit for collecting distributed ledger information of a blockchain corresponding to a specific cryptocurrency and standardizing blockchain data extracted from the distributed ledger information, a multi-type data management unit for collecting and standardizing multi-type data related to the cryptocurrency transaction on a Web, a graph generation unit for constructing a cryptocurrency network graph using the standardized blockchain data, constructing a knowledge graph using the standardized multi-type data, and mapping the cryptocurrency network graph and the knowledge graph to generate a multi-layer based transaction analysis knowledge graph, and a graph analysis unit for searching for transaction information using a first cryptocurrency address for which a fund flow is to be tracked as an input address in the transaction analysis knowledge graph, generating a fund flow graph having the input address and an output address as nodes to track a fund flow, and identifying an attribute of each node included in the fund flow graph using the knowledge graph.

Advantageous Effects of Invention

According to the above-described invention, it is possible to analyze cryptocurrency transactions and identify a transaction subject.

In addition, it is possible to minimize the use of crypto-currency as a tool to support illegal activities by detecting illegal transactions using cryptocurrency and learning trans-action patterns.

DESCRIPTION OF EMBODIMENTS

Figure 1:
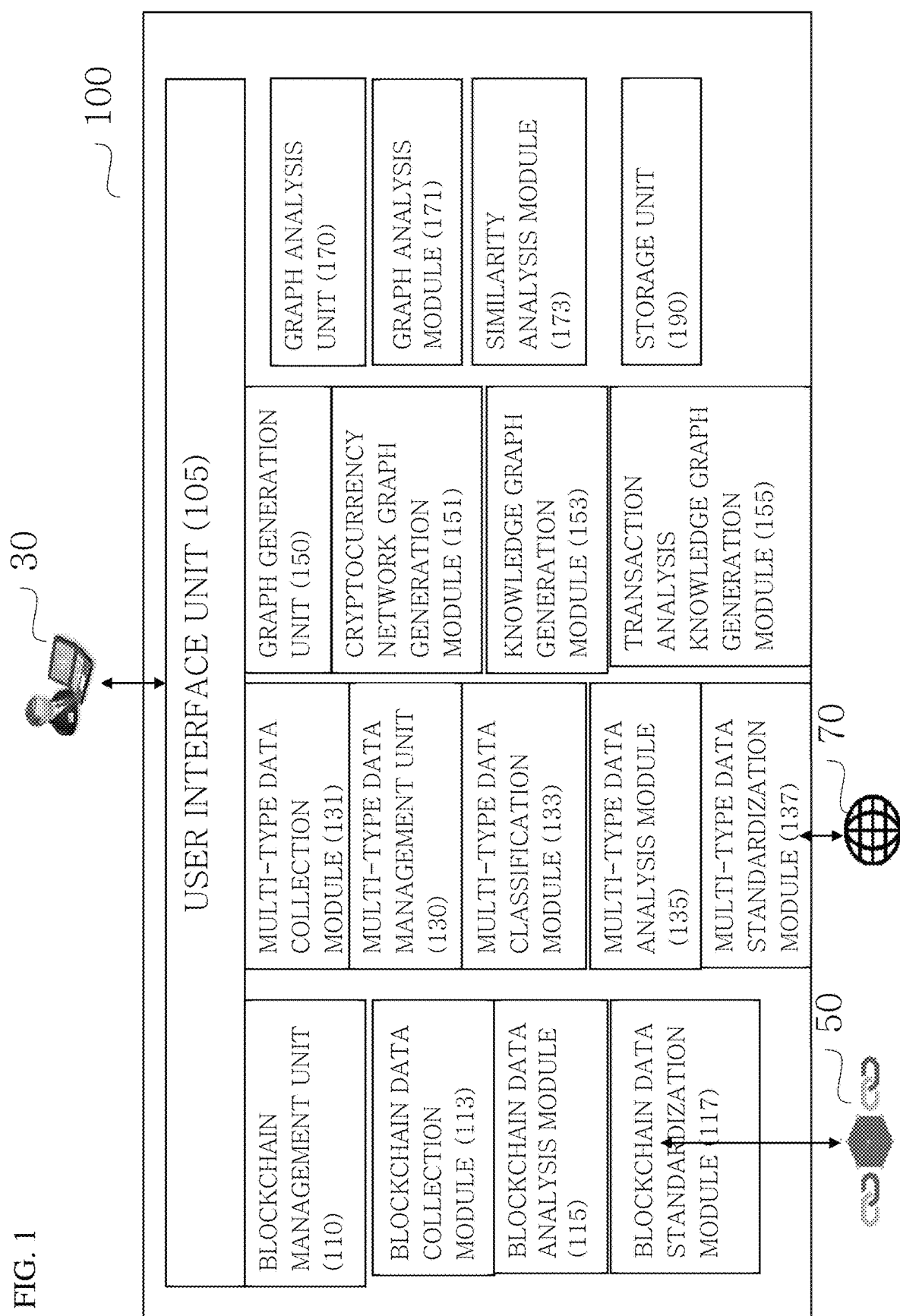
FIG. 1 is a diagram for description of a cryptocurrency transaction analysis system according to an embodiment of the present invention.

The above-described objects, features, and advantages will be described later in detail with reference to the accompanying drawings, and accordingly, a person of ordinary skill in the technical field to which the present invention pertains will be able to easily implement the technical idea of the present invention. In describing the present invention, when it is determined that a detailed description of known technologies related to the present invention may unnecessarily obscure the subject matter of the present invention, a detailed description will be omitted. Hereinafter, preferred embodiments of the present invention will be described in detail with reference to the accompanying drawings. In the drawings, the same reference numerals are used to indicate the same or similar elements, and all combinations described in the specification and claims may be combined in any manner. Further, unless otherwise specified, it is to be understood that references to the singular may include one or more, and references to singular expressions may include plural expressions.

In the present specification, 'knowledge graph' may be understood to mean a knowledge base implemented using a graph. The knowledge base is a technology that derives meaningful information from large-scale data by converting the human brain into a database. Knowledge can be expressed using rules, semantic networks, and frames, and can be expressed using logic or graphs. In the case of implementing a knowledge base using a graph, the graph includes nodes and edges, and the nodes define "objects" having information on various subjects, and the edges define correlations between objects. By constructing a graph-based knowledge base, large-scale data that is difficult for humans to remember can be converted into a database, allowing hidden meanings to be found through machines.

In this specification, 'multi-type data' refers to data collected from the dark web, service web, SNS, etc., and refers to all types of content that can be collected on a web page, and the method includes web crawling, web scraping, etc. and is not limited by a particular method. In this specification, multi-type data may be understood to mean all various types of data related to the above-described object (which may be a person or a product). For example, in the case where an object is a specific person A, when user information about A collected from a web page or an application such as gender, age, ID, name, and hobby of A, type of text or object liked by A, group to which A belongs, friend list of A, location of A, address of A, residence, favorite area of A, favorite store or product information of A, date of member-ship registration on a specific site or social media, recent activity history, and writing time, or if an article for trading item B by A is written, type, quantity, and details of transaction object B, time when A wants to trade B, trans-action method, name of B, image, price to trade (quote price), negotiable availability, account information (includ-ing cryptocurrency address), information about a user inquiring for transaction information, etc. may be included in the multi-type data. Multi-type data is for constructing a knowledge graph, and may be a concept distinguished from 'blockchain data' (data extracted from distributed ledger information of a blockchain) for constructing a cryptocur-rency network graph in the present invention. In other words, multi-type data includes information that is difficult to grasp only with distributed ledger or exchange records.

The blockchain data of this specification is data that can identify cryptocurrency transactions, and may include trans-action characteristics such as information of a previous block recorded in the distributed ledger, a registration time stamp, and a hash value of a previous transaction. According to the present invention, it is possible to create a cryptocur-rency network graph using blockchain data, and when the cryptocurrency network graph is used, it is possible to track paths of cryptocurrency transactions.

A knowledge graph created using multi-type data and a cryptocurrency network graph created using blockchain data can constitute different layers, and objects (nodes) that are common in multiple layers may be vertically connected (mapped) to generate a multi-layer-based transaction analy-sis knowledge graph. When the multi-layer-based transac-tion analysis knowledge graph according to the present invention is used, it is possible to more quickly identify a transaction subject and quickly identify information on an organization to which the transaction subject belongs. In addition, the present invention has a differentiated effect from the prior art in that information related to a transaction subject and object can be quickly grasped without searching, inquiring, analyzing, or checking additional information based on transaction information.

FIG. 1 is a diagram illustrating a cryptocurrency transac-tion analysis system according to an embodiment of the present invention. Referring to FIG. 1, a cryptocurrency transaction analysis system 100 according to the embodiment of the present invention may include a user interface unit 105, a blockchain management unit 110, a multi-type data management unit 130, a graph generation unit 150, a graph analysis unit 170, and a storage unit 190.

The user interface unit 105 may include a graphical user interface (GUI), a user-defined application programming interface (API) that provide search and analysis results for a cryptocurrency network graph and a multi-type data-based knowledge graph. Objects extracted from blockchain data and multi-type data have one or more properties, and the graph-based GUI provides relationships and properties between objects and can provide additional analysis menus and analysis methods for each object.

The user interface unit 105 may provide an API for system environment setting, graph construction and reinforcement, graph search, graph analysis, and graph dynamic alarm setting to a user-defined application, receive setting information and a query from the user 30 through the API, apply the received setting information and query to transaction analysis, and provide a transaction analysis result.

With regard to the system environment setting, the user interface unit 105 may provide, to an application, the API for receiving collection data range setting information such as a list and/or range to be collected or excluded by data collection modules 113 and 131 to construct a graph, data analysis activation setting information such as real-time data analysis setting information of the dynamic data analysis modules 115 and 135, global environment setting for the repository, relationship definition schema for constructing knowledge graphs, and other configuration information necessary for system operation.

With regard to the construction and reinforcement of the knowledge graph, the user interface unit 105 may provide the application with the API for receiving, from the user 30, seed information for data collection such as domain, tag information for analysis results, input of analysis information such as request to change the knowledge graph configuration, and other information that can reinforce the knowledge graph.

With regard to the knowledge graph search, the user interface unit 105 may provide an API for searching for knowledge graph objects and properties, such as full-text search, similarity-based search, and subset search, to the application.

With regard to the knowledge graph analysis, the user interface unit 105 may provide an API that provides information on a knowledge graph analysis based on a graph algorithm and an internal algorithm, such as a fund flow tracking and a sub-graph similarity analysis, to the application.

With regard to the knowledge graph dynamic alarm setting, the user interface unit 105 may provide a special situation setting and an alarm setting API for the knowledge graph to the application.

The blockchain management unit 110 is a configuration that collects the distributed ledger information of the blockchain corresponding to a specific cryptocurrency and standardizes the blockchain data extracted from the distributed ledger information, and may include a blockchain data collection module 113, a blockchain data analysis module 115, and a blockchain data standardization module 117.

The blockchain data collection module 113 may execute one or more cryptocurrency clients 50 to collect information on the distributed ledger of the blockchain. Whether or not to execute the cryptocurrency client 50 may be made at a user request. When the cryptocurrency client 50 provides an API, the blockchain data collection module 113 may request transaction information from the API of the cryptocurrency client 50 to collect distributed ledger information corresponding to the request. When the cryptocurrency client 50 does not provide an external API, the blockchain data collection module 113 may parse the block data managed by the cryptocurrency client 50 to collect distributed ledger information.

The blockchain data analysis module 115 is a module that analyzes distributed ledger information in order to obtain additional information not included in the distributed ledger, and may group the cryptocurrency addresses to estimate the owner of the cryptocurrency addresses included in the distributed ledger information.

In the grouping of cryptocurrency addresses, it is possible to use at least one of a multi-input heuristic algorithm that groups a set of sending addresses based on the possession of a private key corresponding to the public key used as the sending address of the transaction, and an address change heuristic algorithm for grouping a plurality of addresses estimated to be the same owner by using the address to which the balance is returned after remittance. In addition, a user-defined heuristic algorithm may be used, and address filtering and/or address grouping may be performed by a user command.

The multi-input heuristic algorithm uses the transaction attribute of a cryptocurrency in which a plurality of input addresses and a plurality of output addresses (or target addresses) can be used in one transaction. When public address a, b, and c are included in a single transaction, it is likely that a, b, and c are accounts of the same owner. Therefore, the blockchain data analysis module 115 may group a, b, and c by the address of the owner X.

In addition, if the multi-input heuristic algorithm is used, when there is a transaction 1 including input addresses a, b, and c and a transaction 2 including input addresses c, d, and e, it can be assumed that the owners of a, b, c, d and e are the same. In addition, the blockchain data analysis module 115 may group addresses a, b, c, d, and e into the address of the owner X.

The address change heuristic algorithm uses the feature that an address is newly created to get the balance back every time a cryptocurrency transaction is made. For example, when X, who owns UTXO (unspent transaction output) containing 10 bitcoins in address a, transfers 8 bitcoins to Y, a new address a' is created for X, and a balance of 2 bitcoins can be deposited with a'. Therefore, the blockchain data analysis module 115 can determine a and a' as the same owner, and a and a' can be grouped by the address of the owner X.

The blockchain data standardization module 117 may standardize blockchain data including distributed ledger information and cryptocurrency address group information analyzed by the data analysis module according to a preset criterion. The distributed ledger information may include intra-block transaction information such as block creation time, input/output amount, transaction fee, cryptocurrency block data such as previous block and next block, transaction volume, fee, and input/output cryptocurrency address. Therefore, the standardized blockchain data may include cryptocurrency block data included in distributed ledger information of various cryptocurrencies and transaction information within the block, and the type of cryptocurrency and cryptocurrency address group information analyzed by the blockchain data analysis module 115 may be included.

The blockchain data standardization module 117 may manage standardized blockchain data in the storage unit 190, and may perform a function of delivering standardized blockchain data when an external request is received. In addition, blockchain data can be updated according to user requests.

The multi-type data management unit 130 may include a multi-type data collection module 131, a multi-type data classification module 133, a multi-type data analysis module 135, and a multi-type data standardization module 137 as a configuration that collects and standardizes multi-type data related to the cryptocurrency transaction on the Web.

The multi-type data collection module 131 may collect multi-type data related to the cryptocurrency transaction on the Web. When it is desired to track the flow of illegal funds, the multi-type data collection module 131 may collect data from a dark web or a surface web. The dark web is a web that conceals an identity of a user using anonymous routing technology (Tor), and is used for the transmission of harmful advertisements, illegal transactions such as drug transactions, and various financial crimes. Since cryptocurrency is actively used for illegal transactions, it is meaningful to collect dark web data in which illegal transactions are conducted in order to track the flow of illegal funds and identify the owner of the funds. Furthermore, the multi-type data collection module 131 may collect data from DeepWeb such as a forum or a social network service (SNS). The multi-type data collection module 131 may collect data input from a user as multi-type data to be used for generating a knowledge graph. For example, when a user inputs information that 'a bitcoin address A is for Charlse', the bitcoin address A and Charlse can be used to generate knowledge data in a cryptocurrency address-owner relationship.

The multi-type data collection module 131 can crawl web pages using a crawler. When a hyperlink exists in the crawled web page, multi-type data can be collected by additional crawling of web pages linked through hyperlinks. When the user provides seed information, the multi-type data collection module 131 may crawl a web page corresponding to the seed information. The seed information may include domains, URLs, hashtags, keywords, etc. For example, when a user provides a specific address of the dark web where illegal funds are expected to be used as seed information, the multi-type data collection module 131 may expand the data corpus by crawling a web page corresponding to the above address and extracting a link to another website from the crawled data.

The multi-type data classification module 133 may classify multi-type data according to transaction attributes or data sources (domains, URLs).

For example, when the collected web page contains contents such as donation request, knowledge sharing, escrow confirmation, user identification, product advertisement, legal service provision, etc., the data included in the web page may be classified as legal data. As another example, the multi-type data classification module 133 may perform classification by learning a web page structure through machine learning. For example, the multi-type data classification module 133 may learn the structure information of a web page using an HTML table or an XML structure, and may classify similar pages by comparing the structure information of a new web page.

The multi-type data analysis module 135 is a module for extracting cryptocurrency transaction information existing in a web page, and may extract at least one of a cryptocurrency address, transaction information, content type, or user information from the multi-type data. User information may include user ID, user name, writing time, friend list, membership registration date, and recent activity details. In addition, when the user defines specific data, the multi-type data analysis module 135 may extract user-defined data from the multi-type data.

The multi-type data standardization module 137 may standardize information extracted from the multi-type data analysis module 135 according to a preset criterion. Since the information extracted from the multi-type data analysis module 135 has different domains, URLs, contents, etc., the multi-type data standardization module 137 may perform a task of standardizing the extracted data so that the data can be used regardless of the category of the extracted data. For example, information extracted from the analysis module 135 and additional meta information may be inserted to perform standardization in the order of [data source, cryptocurrency type, category].

The graph generation unit 150 has a configuration in which a cryptocurrency network graph is built using standardized blockchain data, a knowledge graph is built using the standardized multi-model data, the cryptocurrency network graph is mapped to the knowledge graph to generate a multi-layer based transaction analysis knowledge graph, and may include a cryptocurrency network graph generation module 151, a knowledge graph generation module 153, and a transaction analysis knowledge graph generation module 155.

The cryptocurrency network graph generation module 151 may create a first node with a first object or first attribute extracted from the standardized blockchain data, and construct a cryptocurrency network graph using each node edge. For example, a network graph such as cryptocurrency input address (object node)-transfer amount (edge)>transaction node-transfer amount (edge)>cryptocurrency output address (object node), or a network graph such as owner X (object node) with group information reflected-transfer amount (edge)>transaction node-transfer amount (edge)>ransomware (property node) may be created. In the above description, '>' indicates directionality, and an edge according to an embodiment of the present invention may have directionality.

Figure 10:
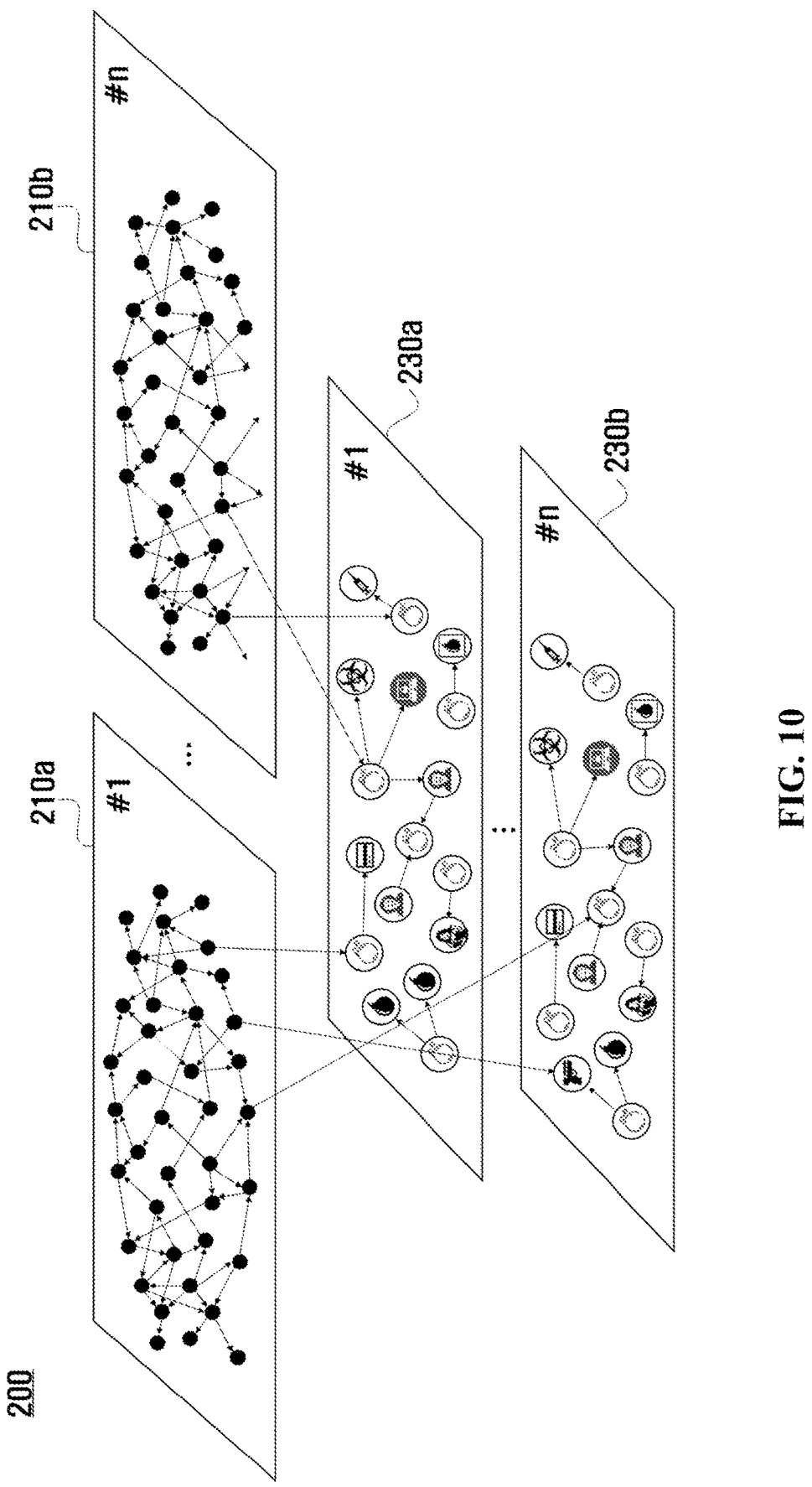
FIG. 10 is a diagram for description of a transaction analysis knowledge graph according to an embodiment of the present invention.

The cryptocurrency network graph may be displayed on one or more layers according to the classified categories. Referring to FIG. 10, when layers are classified according to the type of cryptocurrency, bitcoin data may be displayed in layer #1 (210a) and Ethereum data may be displayed in layer #n (210b). In addition, cryptocurrency network graphs can be displayed on multiple layers according to a user-defined classification criterion.

The knowledge graph generation module 153 may generate a second node with a second object or a second attribute extracted from the standardized multi-type data, and construct a knowledge graph using each node edge. For example, the knowledge graph generation module 153 can generate nodes and edges such as user ID (object node)-owned (edge)>cryptocurrency address (object node) using profile data extracted from a web page, and construct nodes and edges such as cryptocurrency address (object node)-deposit (edge)>product (object node) using sales data extracted from a web page to construct a knowledge graph. The knowledge graph may be displayed on one or more layers like the cryptocurrency network graph (230a and 230b), and thus may have a multi-layer structure. The knowledge graphs for each layer may belong to different categories.

The transaction analysis knowledge graph generation module 155 may generate a transaction analysis knowledge graph by mapping the first node and the second node corresponding to each other. For example, it is assumed that a node (A) included in layer #1 (210a) of the cryptocurrency network graph 210 corresponds to an address a, a node (B) corresponds to an address b, the two addresses belong to the same group, and a node (C) included in layer #1 (230a) of the knowledge graph is the cryptocurrency address b. Since the node (B) and the node (C) contain the same information, the nodes can be mapped to each other (see FIG. 8). That is, the transaction analysis knowledge graph 200 may have a multi-layer structure in which nodes of the cryptocurrency network graph 210 and the knowledge graph 230 are mapped to each other. Therefore, when the transaction analysis knowledge graph 200 is used, it is possible to interpret the components of the cryptocurrency network graph 210 through the components of the knowledge graph 230. For example, when the node (C) is connected to the node (D) indicating the user ID by the owner edge, it may be determined that the owners of the addresses a and b are a person having a user ID corresponding to the node (D).

The graph analysis unit 170 may include a graph analysis module 171 that analyzes a transaction analysis knowledge graph and a similarity analysis module 173 that analyzes the similarity of fund transactions.

The graph analysis module 171 may analyze the transaction analysis knowledge graph 200 for cryptocurrency transaction analysis. For example, transaction information using a cryptocurrency address to track the flow of funds in the transaction analysis knowledge graph as an input address is searched for, a fund flow graph with input address and output address as nodes is generated to track the flow of funds, and the attribute of each node included in the fund flow graph may be identified using the knowledge graph.

Furthermore, the graph analysis module 171 may track major nodes of cryptocurrency transactions in a transaction analysis knowledge graph based on a graph algorithm. For example, through centrality analysis, the central node of the fund flow can be extracted, or nodes related to details of a fund flow of a specific product can be extracted. Alternatively, it is possible to analyze a correlation of fund transactions between objects through path analysis.

In addition, the graph analysis module 171 can track the fund flow of the cryptocurrency based on the pollution analysis technology, which will be described later with reference to FIGS. 6 to 7, and 9 to 10.

The similarity analysis module 173 may derive a pattern of fund transactions based on the knowledge graph. For example, when a drug transaction is frequently performed by a specific user A on a cryptocurrency trading site B, since there will be a number of specific user-drug transaction-cryptocurrency transaction site nodes and edges in the knowledge graph, the similarity analysis module 173 may define the above contents as one pattern in the knowledge graph.

The similarity analysis module 173 may learn a fund transaction pattern using machine learning, and may derive a similar pattern. For example, pattern learning may be performed by learning the input/output level (degree) for the node, the sequence for the edge, the amount, and other objects and properties of the corresponding object. In addition, the similarity analysis module 173 may dynamically derive a pattern, thereby generating an alarm and providing the alarm to a user when a suspicious fund transaction pattern occurs.

The storage unit 190 may store standardized blockchain data, standardized multi-type data, a cryptocurrency network graph generated by the graph generation unit 150, a knowledge graph, a transaction analysis knowledge graph, etc. The storage unit 190 may be included in the cryptocurrency transaction analysis system 100, or may be a database built outside the cryptocurrency transaction analysis system 100.

Hereinafter, a method of analyzing a cryptocurrency transaction according to an embodiment of the present invention will be described with reference to FIGS. 2 to 10.

Figure 2:
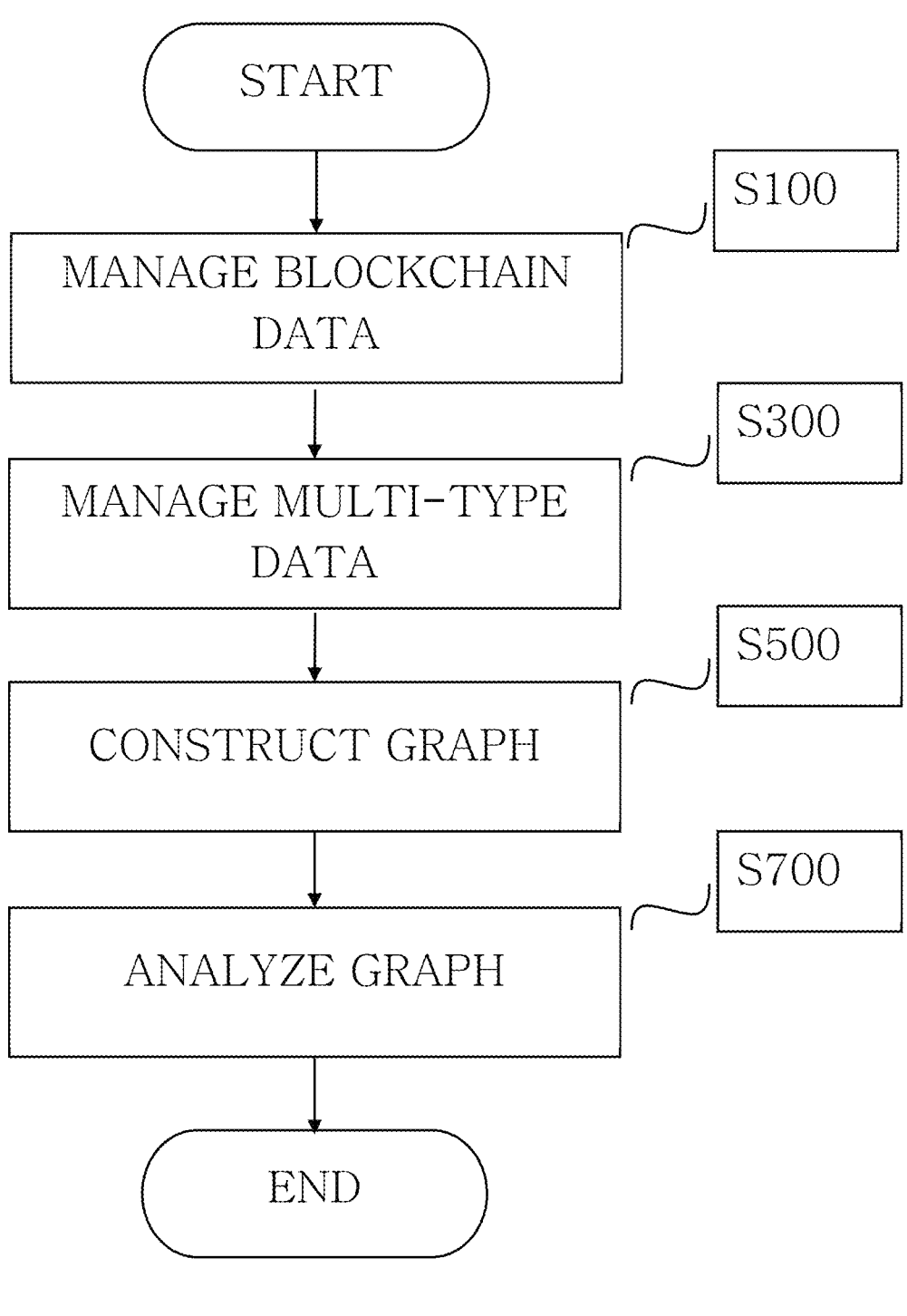
FIG. 2 is a flowchart for description of a cryptocurrency transaction analysis method according to an embodiment of the present invention.

FIG. 2 is a flowchart illustrating a method of analyzing a cryptocurrency transaction according to an embodiment of the present invention. Referring to FIG. 2, an electronic device may manage blockchain data in a manner that collects distributed ledger information of a blockchain corresponding to a specific cryptocurrency and standardizes the blockchain data extracted from the distributed ledger information (S100). Next, the electronic device may manage the multi-type data by collecting and standardizing multi-type data related to the cryptocurrency transaction on the Web (S300). The electronic device constructs a cryptocurrency network graph using the standardized blockchain data, constructs a knowledge graph using the standardized multi-type data, and maps the cryptocurrency network graph and the knowledge graph to generate a multi-layer based transaction analysis knowledge graph (S500). In addition, the electronic device searches for transaction information using a first cryptocurrency address to be tracked in the transaction analysis knowledge graph as an input address, creates a fund flow graph with an input address and an output address as nodes to track the fund flow, and perform graph analysis by identifying the attributes of each node included in the fund flow graph using the above knowledge graph (S700). An electronic device that performs the cryptocurrency transaction analysis method is a device including a computer processor and a wired/wireless communication module, and may perform each step of the cryptocurrency transaction analysis method by receiving setting information, seed information, and inquiries from the user terminal and collecting necessary information from the cryptocurrency client and the web.

Figure 3:
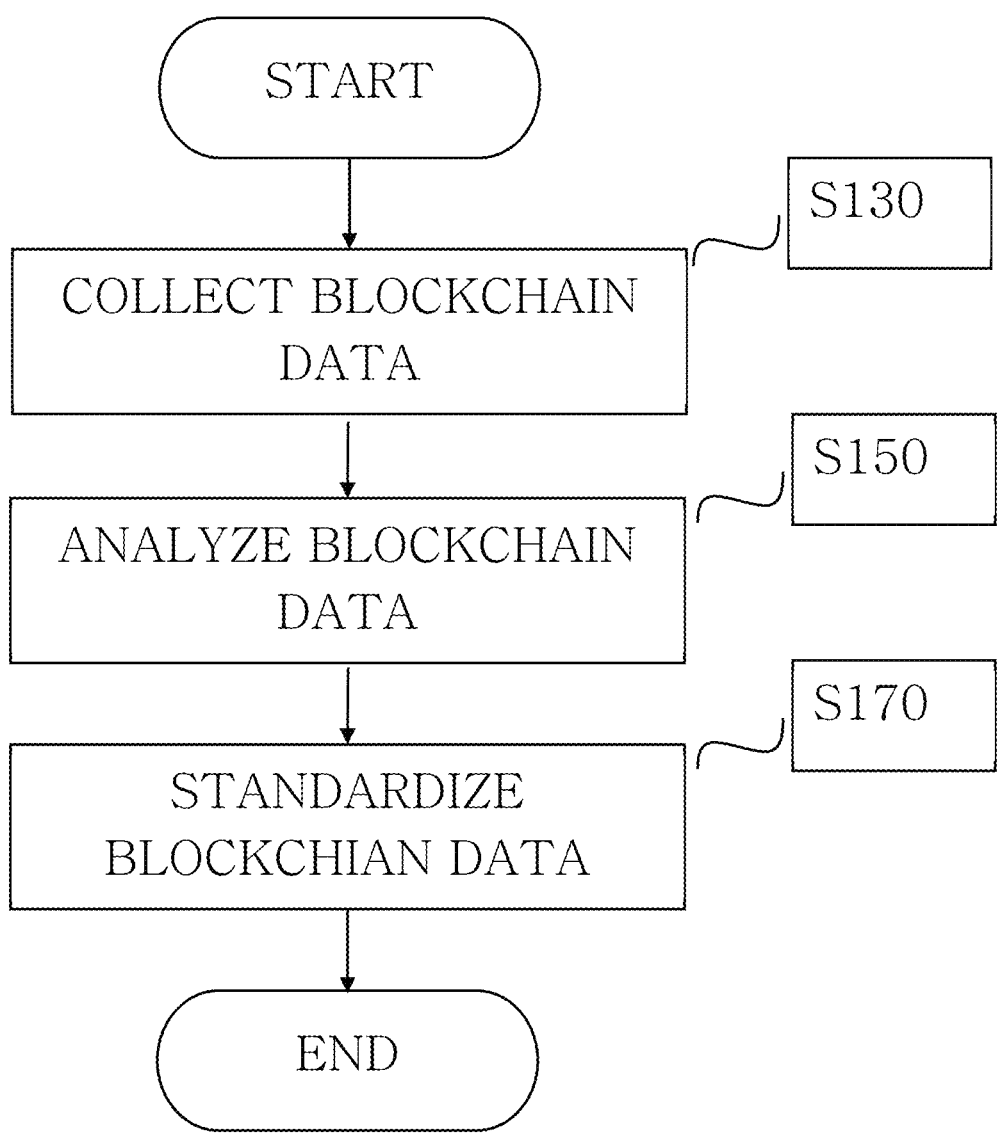
FIG. 3 is a flowchart for description of a blockchain management method according to an embodiment of the present invention.

Referring to FIG. 3, in step 100, the electronic device executes one or more cryptocurrency clients to collect distributed ledger information of the blockchain to collect the blockchain data (S130), and analyzes blockchain data (for example, groups addresses estimated to be the same owner using the distributed ledger information) (S150). In step 150, the electronic device may group a plurality of input addresses included in a transaction or group a plurality of groups including the same address into one group by using a multi-input heuristic algorithm that groups a set of transmission addresses by whether or not the addresses possess a private key corresponding to a cryptocurrency address used as a transmission address of the transaction. Furthermore, using an address change heuristic algorithm, a plurality of addresses presumed to be the same owner can be grouped using an address that receives the balance after remittance.

Next, the electronic device may standardize blockchain data including the distributed ledger information and group information analyzed by the data analysis module according to a preset standard (S170).

Figure 4:
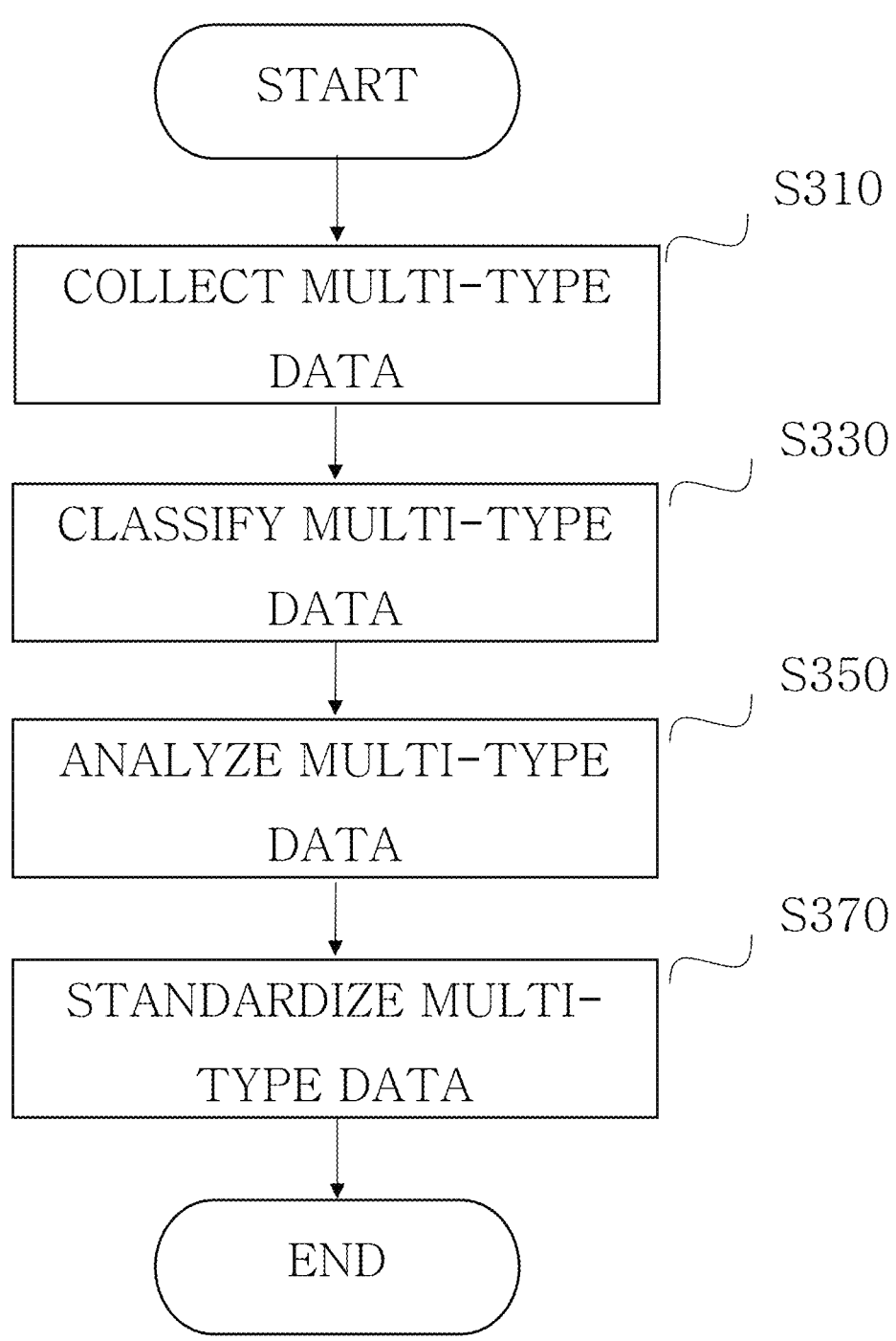
FIG. 4 is a flowchart for description of a multi-type data management method according to an embodiment of the present invention.

Referring to FIG. 4, in step 300, the electronic device may collect multi-type data related to the cryptocurrency transaction on the Web (S310), classify the multi-type data into categories according to transaction attributes (S330), and analyze multi-type data by extracting at least one of a cryptocurrency address, transaction information, or user information from the multi-type data (S350). In addition, the extracted information may be standardized according to a preset criterion (S370).

Figure 5:
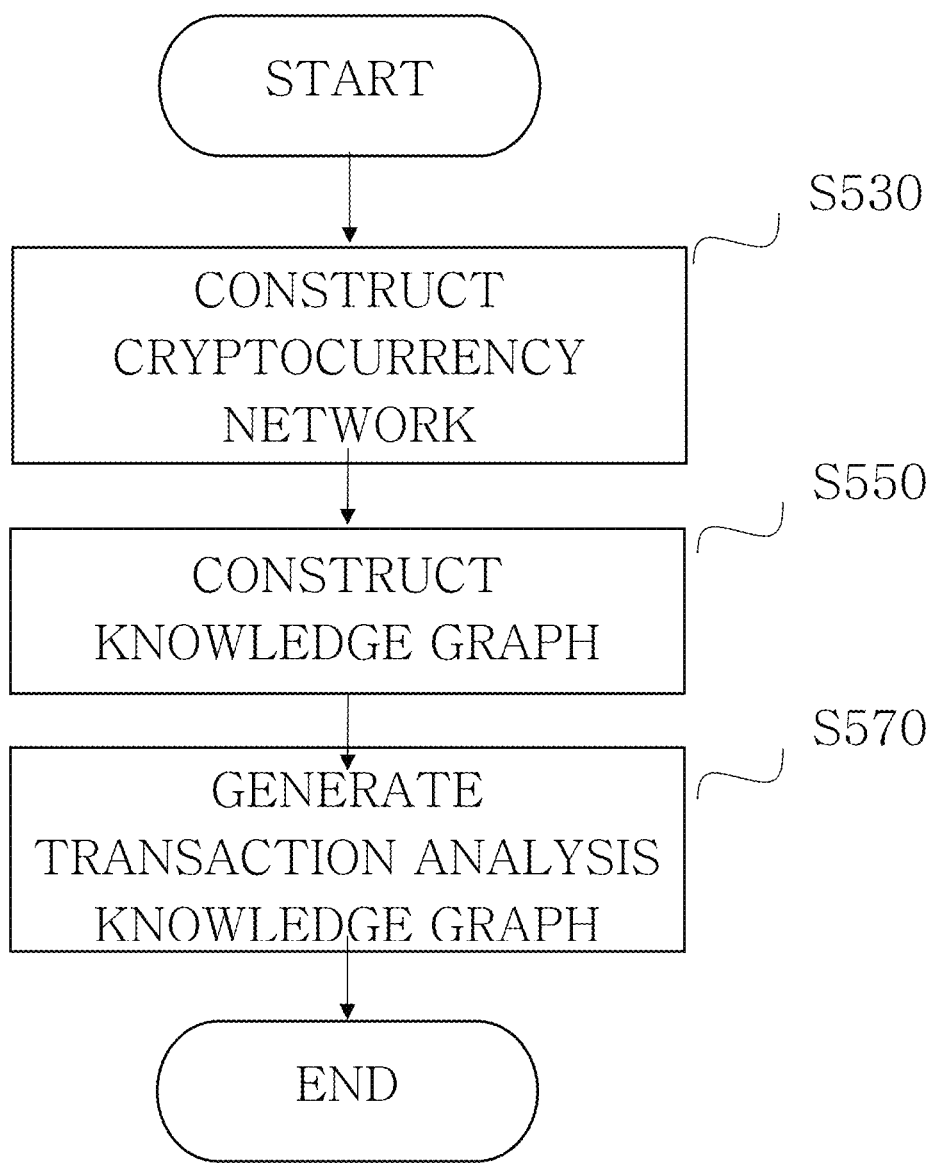
FIG. 5 is a flowchart for description of a graph generation method according to an embodiment of the present invention.

Referring to FIG. 5, in step 500, the electronic device may create a first node with a first object or a first attribute extracted from the standardized blockchain data, construct a cryptocurrency network graph by connecting a relationship between nodes with an edge (S530), generate a second node with a second object or a second attribute extracted from the standardized multi-type data, and construct a knowledge graph by connecting the relationship between nodes with the edge (S550). The electronic device may generate a transaction analysis knowledge graph by mapping the first node and the second node corresponding to each other in the cryptocurrency network graph and the knowledge graph (S570).

Figure 6:
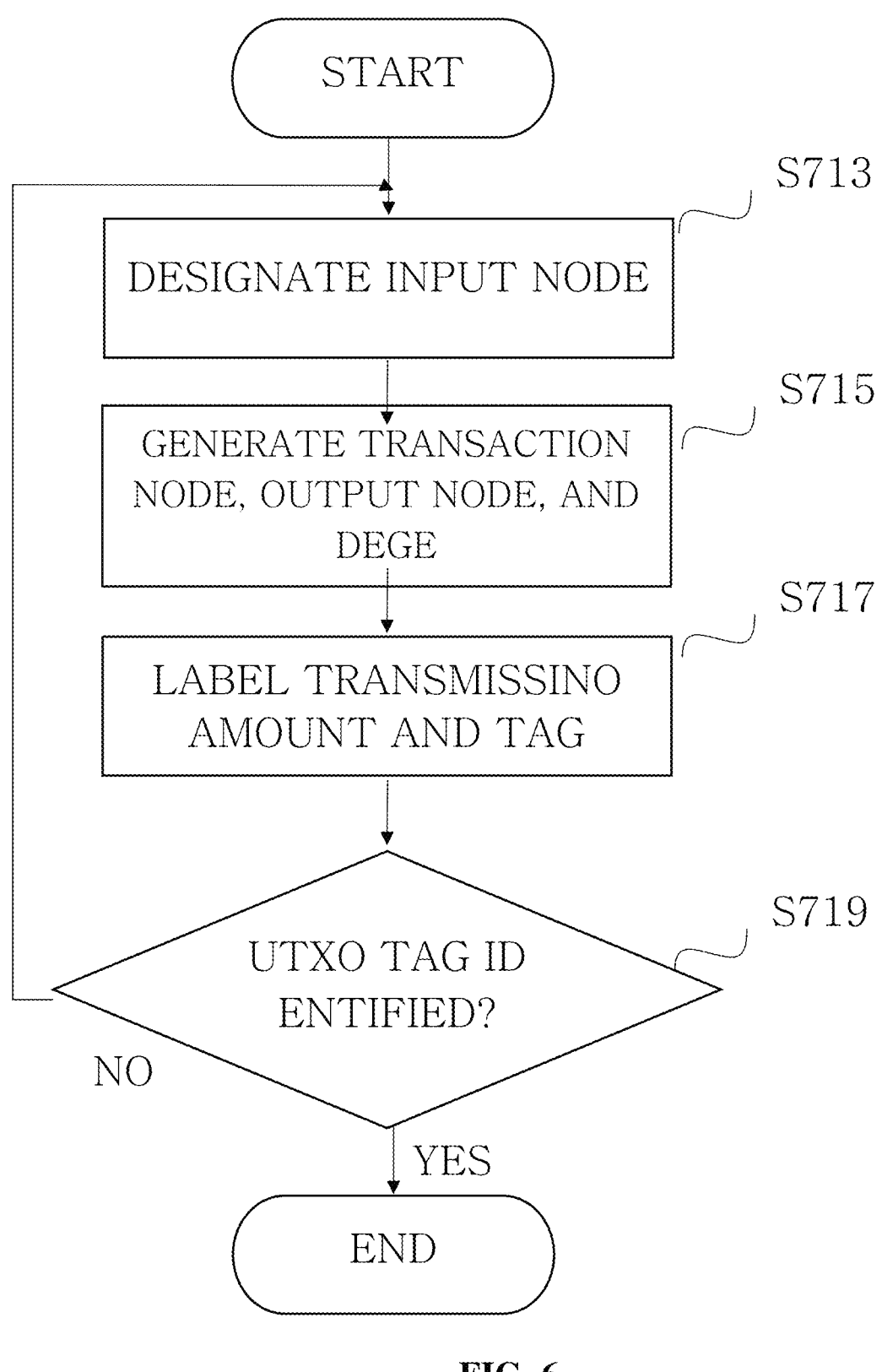
FIG. 6 is a flowchart for description of an output fund flow graph generation method according to an embodiment of the present invention.

Step 700 will be described in more detail with reference to FIGS. 6 to 8. FIG. 6 is a flow chart for describing in more detail a step of generating a fund flow graph in step 700. When the electronic device desires to track the flow of funds flowing from the first cryptocurrency address, the electronic device generates an output fund flow graph in the following manner.

Referring to FIG. 6, in step a, the electronic device first designates a first cryptocurrency address for which a fund is to be tracked in the transaction analysis knowledge graph as an input node, and searches for one or more pieces of first transaction information using an address of the input node as an input address (S713). Next, the electronic device generates a transaction node, an output node, and an edge (S715). Step 715 includes steps b and c. Step b is a step of generating a transaction node (TX) for each transaction using first transaction information, and connecting the input node and the transaction node to an input edge (TxIn), and step c is a step of generating an output node (Addr) corresponding to an output address included in the first transaction information, and connecting the transaction node and the output node to an output edge (TxOut). Next, in step d, the electronic device may label the amount transmitted for the input edge and the output edge, and label the UTXO tag on the output edge corresponding to the transaction in which the output is not consumed (S717). When the labeling of the transmission amount and the tag is completed, the electronic device verifies whether the UTXO tag is labeled on the output edge, and designates the output nodes as input nodes for the output edge where the UTXO tag is not labeled, thereby repeatedly performing steps 713 to 717. When it is determined that the UTXO tag is labeled on the output edge or the output address included in the first transaction information is a previously identified address, the electronic device may terminate graph generation for the output node connected to the corresponding edge.

Figure 11:
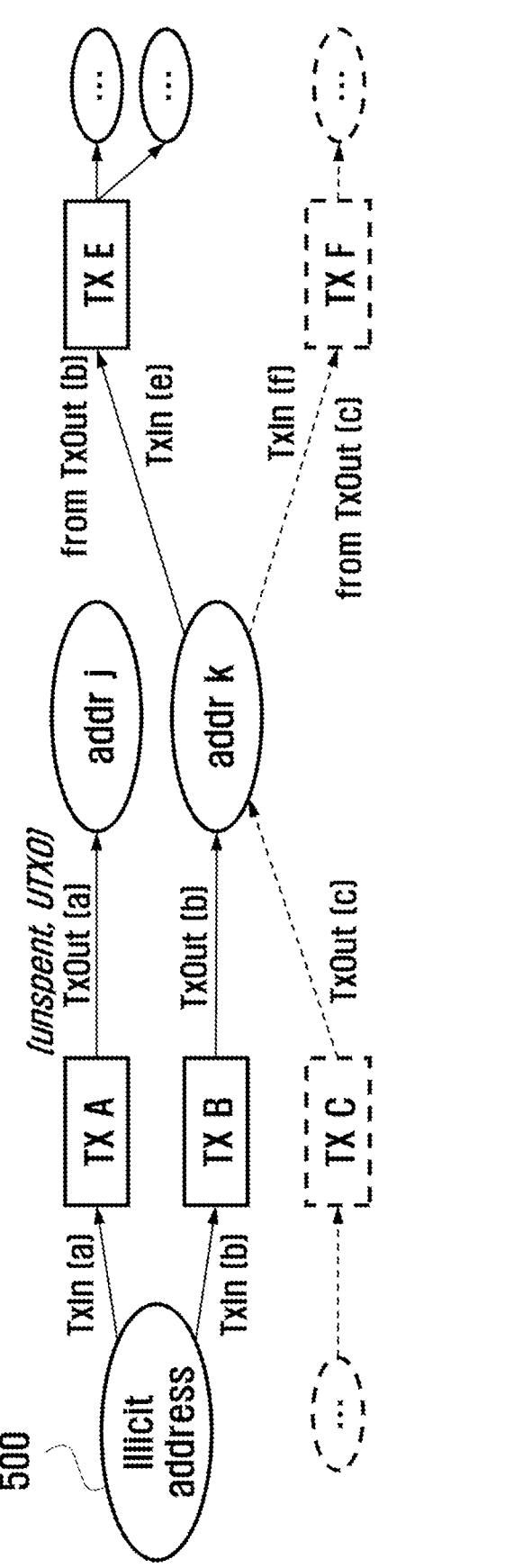
FIG. 11 is a diagram for description of a fund flow graph according to an embodiment of the present invention.

An example of a method of generating a fund flow graph is illustrated in FIG. 11. FIG. 11 is a graph for tracking a fund flow from an illegal bitcoin address 500, and the fund flow graph according to the embodiment of the present invention is a root-oriented graph in which a first cryptocurrency address for which a fund flow is to be tracked is a root node. When attempting to track the fund flow flowing from an illegal bitcoin address, first, an illegal bitcoin address is designated as an input node (root node), and one or more pieces of transaction information using the address of the root node 500 as an input address is searched. Then, the electronic device generates a transaction node (TX) for each transaction, and connects the transaction node (TX) at the root node to an input edge (TxIn). Next, an output node (Addr) for the output address is generated, and the transaction node (TX) and the output node (Addr) are connected using the output edge (TxOut) pointing to the output node. A fund flow graph is generated using a subsequent transaction with an output address corresponding to each of the generated output nodes as an input address. Subsequent transaction refers to a transaction in which the output of the current transaction (TxOut) is consumed as an input (TxIn) of the next transaction. As illustrated in FIG. 11, even when there are two transactions (TX E and TX F) with addr k as inputs, the graph analysis module 171 tracks TX E as the next transaction, so that only the input edge TxIn(e) is analyzed to be consumed from the output edge TxOut(b). The bitcoins processed in transaction TX F come from TxOut(c), not from illegal bitcoin addresses, and thus the bitcoins are discarded in this fund flow tracking. The graph analysis module 171 of the electronic device starts from an illicit address (root node) and expands the graph by continuously adding the fund receiving address to the graph. The graph analysis module 171 iteratively adds a transaction node and an output node to the graph until the last output node is identified as a TXOut edge with a UTXO tag. In addition, when adding a new address node to the graph, the graph analysis module 171 may find out a cryptocurrency address of a cryptocurrency service company and tag the information into a corresponding address group (cluster). When the address is owned by a well-known service provider, the graph analysis module 171 may label the service name on the node and stop searching for the next transaction information.

Examples of service providers that become the final destination of illegal fund tracking according to an embodiment of the present invention include exchanges where cryptocurrency exchanges are performed, wallet service providers, online gambling sites such as poker and casinos, stores where illegal products can be sold or purchased, and companies that launder cryptocurrency to improve anonymity.

In step 700, when the generation of the fund flow graph is completed, the electronic device or the graph analysis module 171 may track the flow of the fund by quantifying the fund flow. Fund flow tracking can be done through a method of quantifying the amount of cryptocurrency transferred from one address to another.

In order to track the output fund flow, the electronic device calculates a ratio of the amount labeled on the first output edge to the sum of the amounts labeled on all output edges connected to the first transaction node as a pollution rate of the first output edge (S731), and a pollution value of the first output node connected to the first output edge is calculated using the pollution value of the first input node connected to the first transaction node and the input edge and the pollution ratio of the first output edge (S733). The pollution value of the root node is 1. The electronic device may identify the fund flow by determining the pollution value of the first output node as the ratio of the funds received from the first cryptocurrency address (S735).

In tracing the output fund flow, the pollution value means a ratio of the cryptocurrency transmitted from the first cryptocurrency address (initial input address) for which the fund flow is to be traced to each destination address (output address).

Equations 1 to 3 below represent a method for quantifying a fund flow according to an embodiment of the present invention.

$$taint_{b,t} = \sum_{pt \in N_j^{t,b}} \frac{output_{pt,next}}{\sum_i output_{pt,i}} \qquad \text{[Equation 1]}$$

The pollution value $taint_{b,t}$ of the input node is shown in Equation 1. In Equation 1, $$N_j^{t,b}$$

is a set of j-th transactions including a set of a withdrawal transaction t and the next transaction reaching a destination cryptocurrency address b, and a transaction pt is one of the transactions belonging to the set $$N_j^{t,b}.$$

Further, $output_{pt,i}$ is the amount of the output edge i of the transaction pt, and $output_{pt,next}$ is the amount corresponding to the subsequent output edge consumed in the next transaction belonging to $$N_j^{t,b}.$$

In other words, it is multiplied by a ratio obtained by dividing a value belonging to the output in the current transaction by all output values belonging to the current transaction. In addition, it continuously follows the next transaction in which the output is consumed in the current transaction, and multiplies the ratio of all output amounts calculated in all transactions belonging to $$N_j^{t,b}.$$

Finally, by summing all the multiplied values for each transaction set j, the pollution value from the input node a to the output node b starting from the transaction t is calculated.

$$ratio_t = \frac{\sum_i input_{t,i}}{\sum_{k \in T} \sum_i input_{k,i}}$$ [Equation 2]

Equation 2 defines a pollution ratio ($ratio_t$) as a normalization function representing a value obtained by dividing a portion of the input funds in the transaction t by the sum of the input funds in order to reflect the fund flow ratio from the input address a to each fund withdrawal transaction. For all input edges where the address of the input edge is the same as the address a of the input node, $input_{t,i}$ is the amount of the input edge i in the transaction t, and $input_{k,i}$ denotes the amount of the input edge i of the transaction k for all withdrawal transactions. To calculate the ratio, the total sum of the amounts corresponding to the input edges of transaction t is divided by the total sum of the input edge amounts belonging to all output transactions T.

$$taint_b = \sum_{t \in T} ratio_t * taint_{b,t}$$ [Equation 3]

Equation 3 is an equation for a final pollution value $taint_b$. The final pollution value $taint_b$ is calculated by multiplying the pollution rate for each transaction t by the pollution value of the input node and adding the calculated values for the transaction t belonging to all output transactions T.

Figure 12:
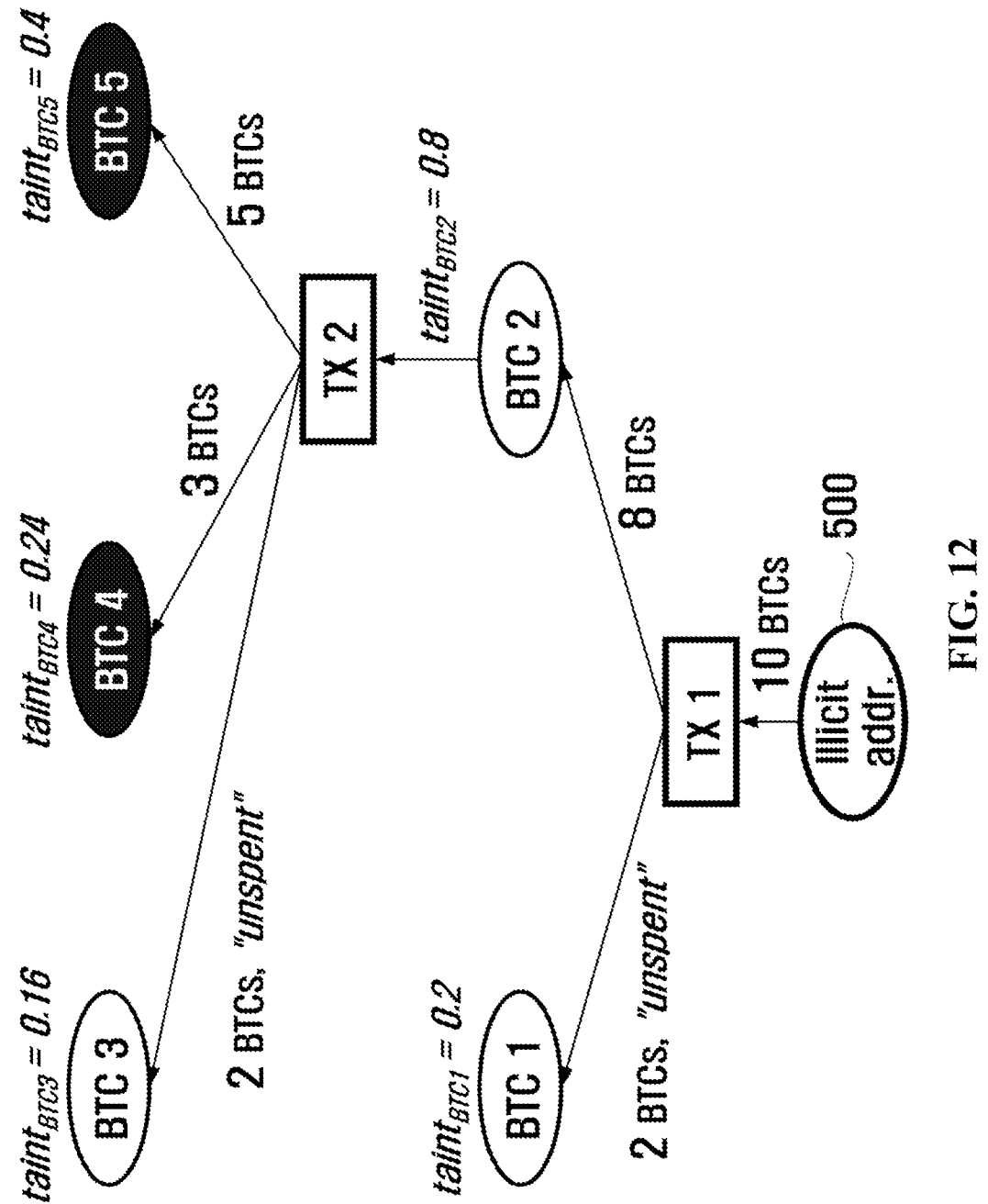
FIG. 12 is a diagram for description of a fund flow analysis method according to an embodiment of the present invention.

In FIG. 12, a fund flow graph is disclosed in which an illegal bitcoin address 500 for which a fund flow is to be tracked is a root node in order to describe a method of calculating a pollution value. When the amount of illegal funds is 10 BTC, the funds are transferred via transaction node TX1 to two different Bitcoin addresses, BTC1 and BTC2. Here, 20% of the illegal funds are transferred to BTC1 and 80% to BTC2. Since the UTXO tag is labeled on the output edge of the transaction node TX1, the final pollution value of BTC1 is calculated, and the final pollution value of BTC1 is 20%. When calculating the final pollution value of each output node based on the ratio of the total amount of output sent to each output address across the transaction node TX2, the final pollution value of BTC3 is 16% (0.8*0.2=0.16), and final pollution values of BTC4 and BTC5 are 24% (0.8*0.3=0.24) and 40% (0.8*0.5=0.4), respectively. Since the outputs of TX1 and TX2 for BTC1 and BTC3 remain unused and BTC4 and BTC5 are owned by well-known Bitcoin service providers (i.e. exchange services), the graph analysis module 171 may not perform additional tracking of the next transaction. In the embodiment of FIG. 10, it can be estimated that 36% of bitcoins among 10 illegal bitcoins remain unused, and 64% of bitcoins have been remitted to addresses in an exchange category, such as an exchange. As such, according to the present invention, it is possible to determine the amount of illegal funds and a place to which the illegal funds have flowed, despite the anonymity of cryptocurrencies.

Figure 7:
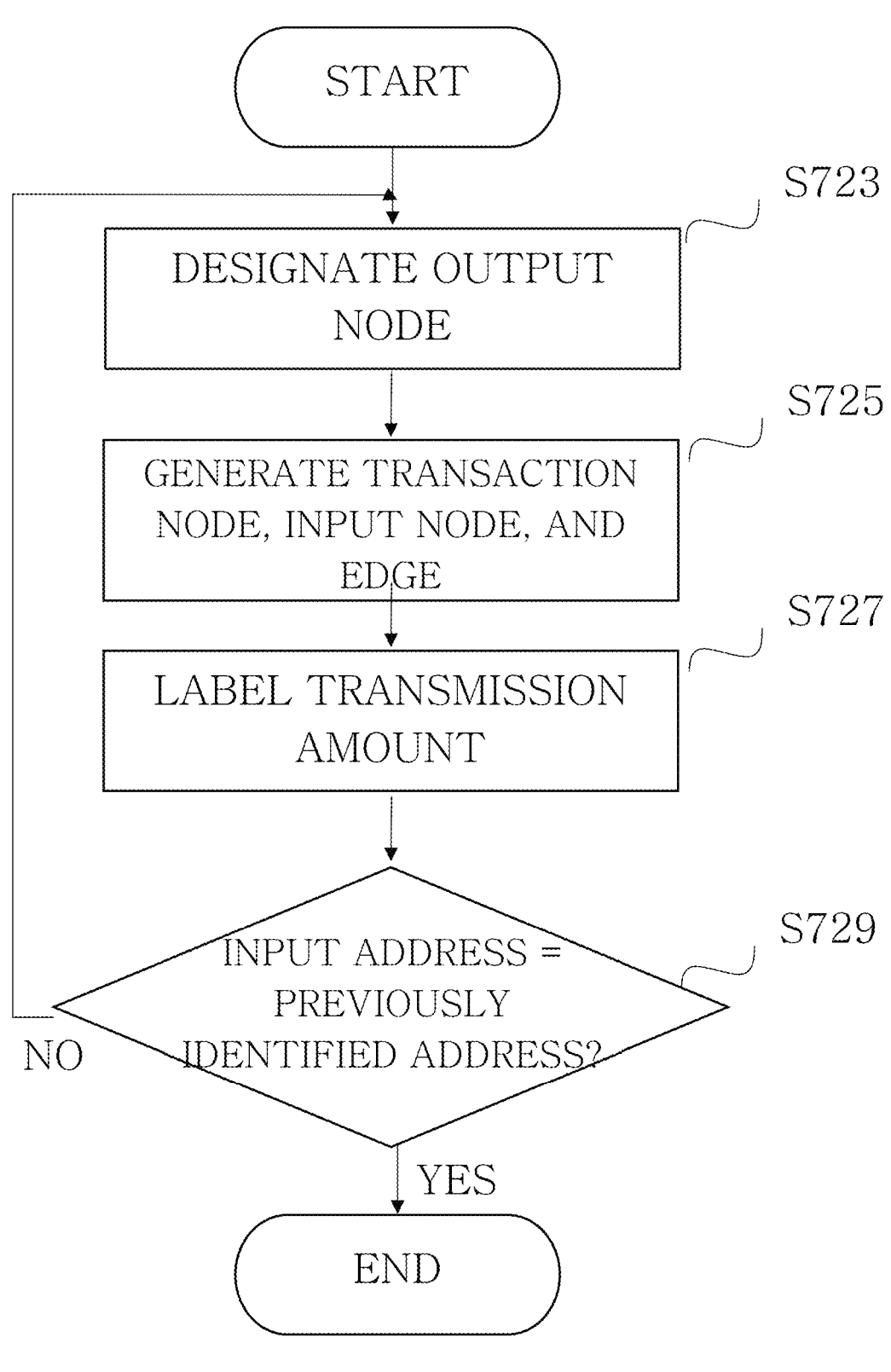
FIG. 7 is a flowchart for description of an input fund flow graph generation method according to an embodiment of the present invention.
Figure 8:
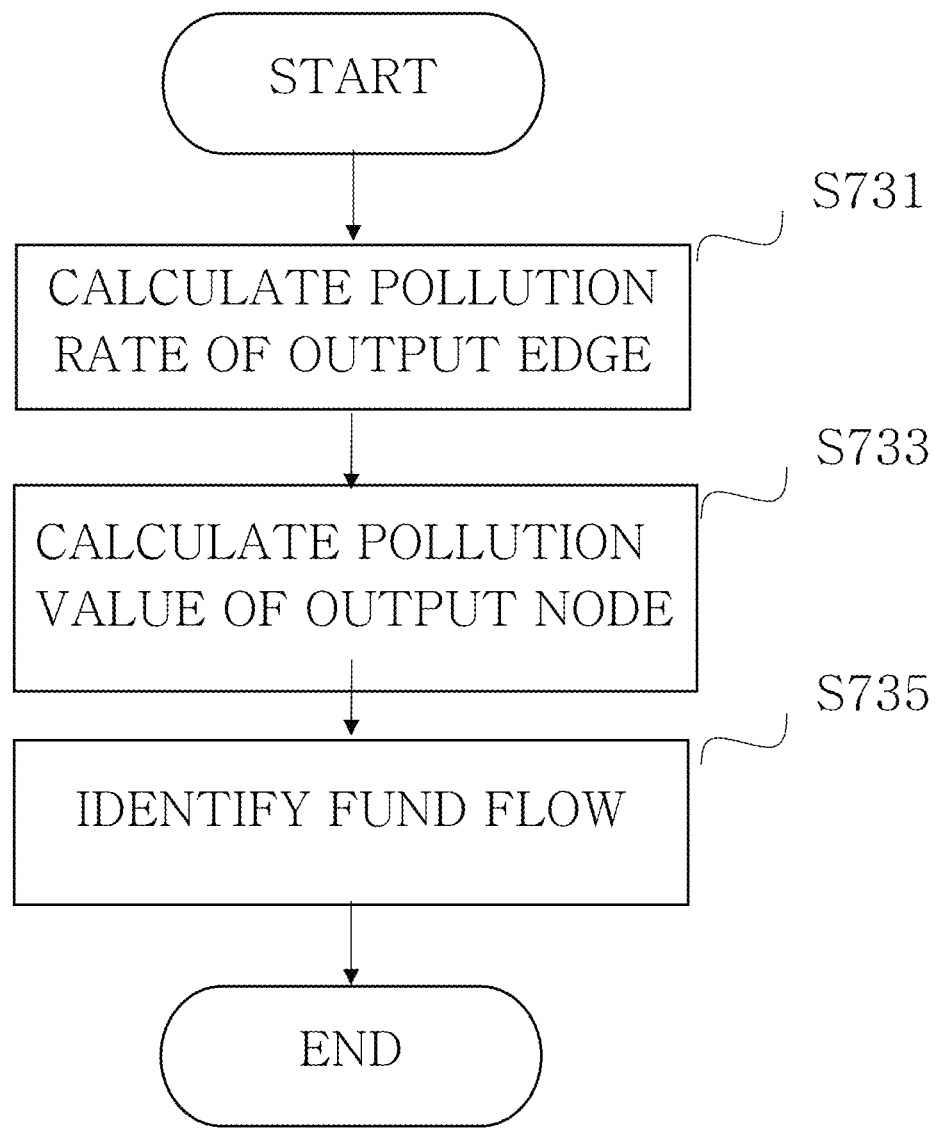
FIG. 8 is a flowchart for description of an output fund flow analysis method according to an embodiment of the present invention.

As another example of step 700, referring to FIG. 7, the electronic device may generate an input fund flow graph for tracking the input fund flow and track the input fund flow. The tracking of the input fund flow can be achieved by reversing the above-described output fund flow graph generation and output fund flow tracking. For example, the input fund flow graph can be generated by performing a step a' (S723) of designating a second cryptocurrency address for which the input fund flow is to be tracked as an output node in the transaction analysis knowledge graph, and searching for one or more pieces of second transaction information using the address of the output node as an output address, a step b' of generating a transaction node (Tx) for each transaction using the second transaction information, and connecting the output node and the transaction node to an output edge (TxOut), a step c' (S725) of generating an input node (Addr') corresponding to the input address included in the second transaction information, and connecting the transaction node (Tx) and the input node to an input edge (TxIn), a step d' (S727) of labeling the amount transferred for the input edge and the output edge, and steps a' to d' (S729) repeatedly by designating an input node as an output node until it is determined that the input address included in the second transaction information is the previously identified address. That is, the generation of the input fund flow graph can be understood as a process of searching for the upper node that has transmitted cryptocurrency to the corresponding node with the node to be tracked as the lowest node.

In the case of steps 719 and 729, it is possible to set a specific condition to generate a fund flow graph until the corresponding condition is satisfied. However, the user can set the depth of node creation to generate the graph to a desired depth.

Figure 9:
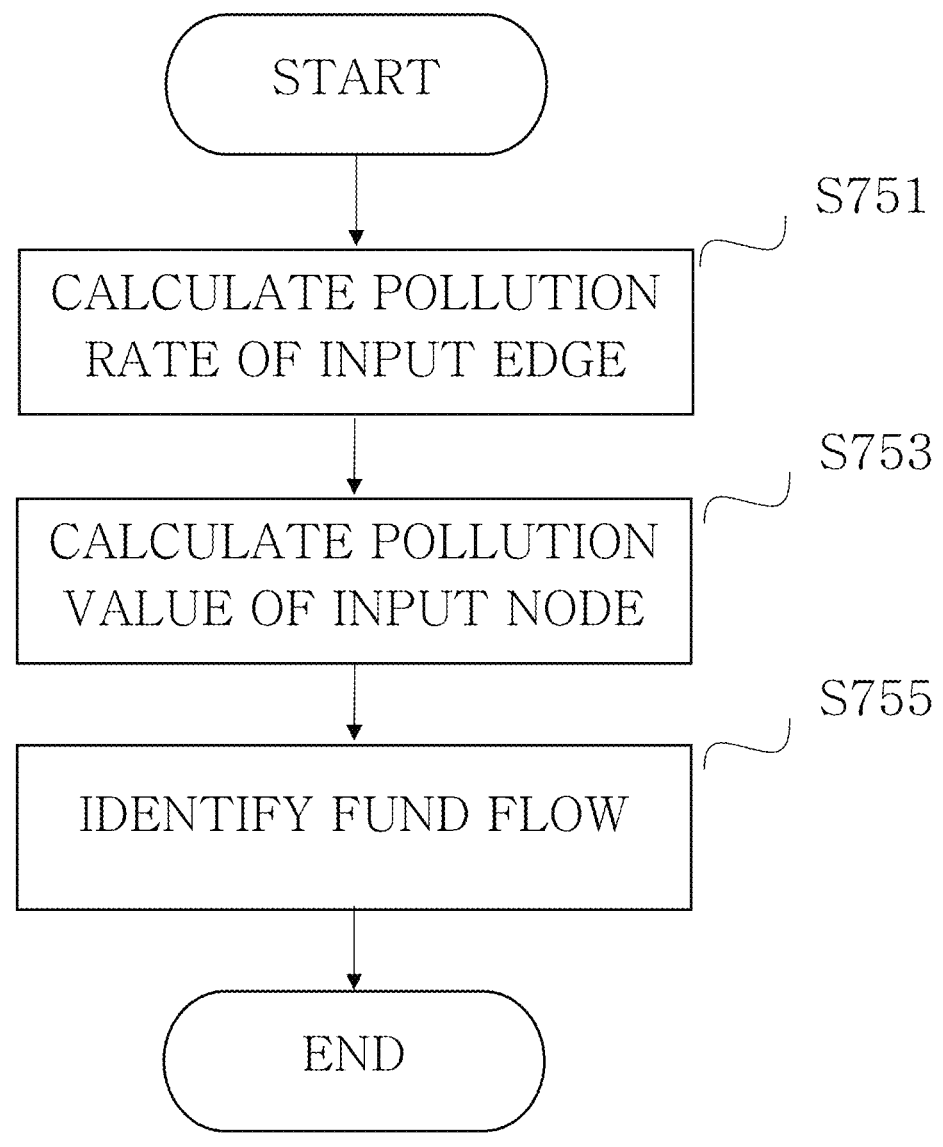
FIG. 9 is a flowchart for description of an input fund flow analysis method according to an embodiment of the present invention.

In tracking the flow of input funds, referring to FIG. 9, the electronic device may calculate the ratio of the amount labeled on the second input edge to the sum of the amounts labeled on all input edges connected to the second transaction node as the pollution ratio of the second input edge (S751), calculate the pollution value of the second input node connected to the second input edge by using the pollution value of the second output node connected to the second transaction node and the output edge and the pollution ratio of the second input edge (S753), and determine the pollution value of the second input node as the ratio of the funds flowing into the second cryptocurrency address (S755).

The apparatus and method according to the embodiment of the present invention may be implemented in the form of program instructions that can be executed by various computer means and recorded in a computer-readable medium. The computer-readable medium may include program instructions, data files, data structures, etc., alone or in combination. The program instructions recorded on the computer readable medium may be specially designed and configured for the present invention, or may be known and available to those skilled in the computer software field. Examples of the computer-readable recording medium include magnetic media such as hard disks, floppy disks and magnetic tapes, optical media such as CD-ROMs and DVDs, magneto-optical media such as floppy disks, and hardware devices specially configured to store and execute program instructions, such as ROM, RAM, flash memory, etc. In addition, the above-mentioned medium may be a transmission medium such as an optical or metal wire or waveguide including a carrier wave for transmitting a signal designating a program command, a data structure, etc. Examples of program instructions include not only machine language codes such as those produced by a compiler, but also high-level language codes that can be executed by a computer using an interpreter, etc. The hardware devices described above may be configured to operate as one or more software modules to perform the operations of the present invention, and vice versa.

Some embodiments omitted in this specification are equally applicable when the implementing subject is the same. In addition, since the above-described present invention is capable of various substitutions, modifications and changes within the scope without departing from the technical spirit of the present invention for those of ordinary skill in the art to which the present invention pertains, and thus is not limited by the above-described embodiments and accompanying drawings.

What is claimed:

1. A method of analyzing a cryptocurrency transaction by an electronic device including a user interface unit including an application programing interface (API), a memory storing instructions and a processor configured to execute the instructions to perform the method, the method comprising:

a system environment setting step of setting system environment of the electronic device by receiving collection data range setting information using the API of the user interface unit;

a blockchain management step of collecting distributed ledger information of a blockchain corresponding to a specific cryptocurrency from one or more cryptocurrency clients according to the collection data range setting information and standardizing blockchain data extracted from the distributed ledger information;

a multi-type data management step of collecting multi-type data related to the cryptocurrency transaction from web pages by crawling of a crawler according to the collection data range setting information and standardizing the multi-type data, the multi-type data being additional information of the blockchain not included in the distributed ledger information and comprising data from one or more network services (SNS), dark web or surface web, wherein the collecting of the multi-type data comprises, based on a hyperlink existing in a web page among the crawled web pages, crawling, by the crawler, a web page linked through the hyperlink;

a graph generation step of (i) creating a first node with a first object or first attribute extracted from the standardized blockchain data, (ii) constructing a cryptocurrency network graph by using the first node, (iii) creating a second node with a second object or a second attribute extracted from the standardized multi-type data, (iv) constructing a knowledge graph by using the second node, and (v) generating a multi-layer based transaction analysis knowledge graph by mapping the first node and the second node corresponding to each other, a step of receiving a cryptocurrency address associated with a flow of a fund to be tracked;

a graph analysis step of searching for transaction information of the fund using the cryptocurrency address as an input address in the transaction analysis knowledge graph; and a step of generating a fund flow graph having the input address and an output address as nodes to track the flow of the fund; and a step of generating alerts for suspicious or anomalous transaction patterns by using machine learning, wherein the blockchain management step includes:

a blockchain data collection step of collecting the distributed ledger information of the blockchain by using an application programming interface (API) of the one or more cryptocurrency clients, or parsing a block data managed by the one or more cryptocurrency clients, the distributed ledger information of the blockchain including information of a plurality of transactions of the specific cryptocurrency, and a blockchain data analysis step of analyzing a plurality of input addresses based on the collected distributed ledger information of the blockchain, and in response to analyzing the plurality of input addresses, (i) grouping, by using a multi-input heuristic algorithm for the specific cryptocurrency, public addresses included in a single transaction among the plurality of transactions as addresses of a same owner or (ii) grouping, by using the multi-input heuristic algorithm, public addresses in a plurality of address groups included in multiple transactions among the plurality of transactions as addresses of a same owner when each of the plurality of address groups includes a common address, wherein the cryptocurrency network graph is displayed on a plurality of layers classified according to different types of cryptocurrency, and the knowledge graph is displayed on a plurality of layers belonging to different categories, and wherein the multi-layer based transaction analysis knowledge graph has a multi-layer structure in which nodes of the cryptocurrency network graph and the knowledge graph are mapped to each other.

2. The method according to claim 1, wherein the blockchain management step further includes a blockchain data standardization step of standardizing blockchain data including the distributed ledger information and group information analyzed by a data analysis module according to a preset criterion.

3. The method according to claim 1, wherein the blockchain data analysis step further includes an address change heuristic step of grouping a plurality of addresses presumed to be of the same owner by using an address to which a balance is returned after remittance.

4. The method according to claim 1, wherein the multi-type data management step includes a multi-type data collection step of collecting the multi-type data related to the cryptocurrency transaction on the dark web or surface web, a multi-type data classification step of classifying the multi-type data by category according to transaction attributes, a multi-type data analysis step of extracting at least one of a cryptocurrency address, transaction information, and user information from the multi-type data, and a multi-type data standardization step of standardizing the extracted information according to a preset criterion.

5. The method according to claim 1, wherein the graph analysis step includes a step a of designating a first cryptocurrency address for which an output fund flow is to be traced as an input node in the transaction analysis knowledge graph, and searching for one or more pieces of first transaction information using an address of the input node as an input address, a step b of generating a transaction node (Tx) for each transaction using the first transaction information and connecting the input node and the transaction node to an input edge (TxIn), a step c of generating an output node (Addr) corresponding to an output address included in the first transaction information, and connecting the transaction node and the output node to an output edge (TxOut), a step d of labeling an amount transferred for the input edge and the output edge, and labeling the UTXO tag on the output edge corresponding to a transaction for which an output is not consumed, and a step of repeatedly performing the step a to the step d by designating the output node as an input node until an output edge labeled with the UTXO tag is identified or an output address included in the first transaction information is determined to be a previously identified address to generate an output fund flow graph.

6. The method according to claim 5, wherein the graph analysis step includes a step of calculating a ratio of an amount labeled on a first output edge to a sum of amounts labeled on all output edges connected to the first transaction node as a pollution ratio of the first output edge, a step of calculating a pollution value of a first output node connected to the first output edge by using a pollution value of a first input node connected to the first transaction node and an input edge and a pollution ratio of the first output edge, and a step of tracing an output fund flow through a step of determining the pollution value of the first output node as a percentage of funds received from the first cryptocurrency address.

7. The method according to claim 1, wherein the graph analysis step includes a step a' of designating a second cryptocurrency address for which an input fund flow is to be tracked in the transaction analysis knowledge graph, and searching for one or more pieces of second transaction information using an address of the output node as an output address, a step b' of generating a transaction node (Tx) for each transaction using the second transaction information and connecting the output node and the transaction node to an output edge (TxOut), a step c' of generating an input node (Addr') corresponding to an input address included in the second transaction information, and connecting the transaction node (Tx) and the input node to an input edge (TxIn), a step d' of labeling an amount transferred for the input edge and the output edge, and a step of repeatedly performing the steps a' to d' by designating the input node as an output node until it is determined that the input address included in the second transaction information is a previously identified address, thereby generating an input fund flow graph.

8. The method according to claim 7, wherein the graph analysis step tracks an input fund flow through a step of calculating a ratio of an amount labeled on a second input edge to a sum of amounts labeled on all input edges connected to a second transaction node as a pollution ratio of the second input edge, a step of calculating a pollution value of a second input node connected to the second input edge by using a pollution value of a second output node connected to the second transaction node and an output edge and a pollution ratio of the second input edge, and a step of determining the pollution value of the second input node as a ratio of the funds flowing into the second cryptocurrency address.

9. The method according to claim 5, wherein the graph analysis step further includes a step of querying ownership information of the second output node when generating any second output node to identify an owner of an address of the second output node, and labeling the address owner on the second output node and suspending transaction information search when the address owner is one of services included in a list of pre-stored services.

10. An electronic device for analyzing a cryptocurrency transaction, the electronic device comprising:

a user interface unit including an application programing interface (API);

a memory storing instructions; and a processor configured to execute the instructions to:

set system environment of the electronic device by receiving collection data range setting information using the API of the user interface unit, collect distributed ledger information of a blockchain corresponding to a specific cryptocurrency from one or more cryptocurrency clients according to the collection data range setting information and standardize blockchain data extracted from the distributed ledger information, collect multi-type data related to the cryptocurrency transaction from web pages by crawling of a crawler according to the collection data range setting information and standardize the multi-type data, the multi-type data being additional information of the blockchain not included in the distributed ledger information and comprising data from one or more network services (SNS), dark web or surface web, wherein the collecting of the multi-type data comprises, based on a hyperlink existing in a web page among the crawled web pages, crawling, by the crawler, a web page linked through the hyperlink, create a first node with a first object or first attribute extracted from the standardized blockchain data, construct a cryptocurrency network graph by using the first node, create a second node with a second object or a second attribute extracted from the standardized multi-type data, construct a knowledge graph by using the second node, generate a multilayer based transaction analysis knowledge graph by mapping the first node and the second node corresponding to each other, receive a cryptocurrency address explicitly or implicitly associated with a flow of a fund to be tracked, search for transaction information of the fund using the cryptocurrency address as an input address in the transaction analysis knowledge graph, generate a fund flow graph having the input address and an output address as nodes to track the flow of the fund, identify an attribute of each node included in the fund flow graph using the knowledge graph, and generate alerts for suspicious or anomalous transaction patterns by using machine learning, wherein the processor is further configured to:

collect the distributed ledger information of the blockchain by using an application programming interface (API) of the one or more cryptocurrency clients, or parsing a block data managed by the one or more cryptocurrency clients, the distributed ledger information of the blockchain including information of a plurality of transactions of the specific cryptocurrency, and analyze a plurality of input addresses based on the collected distributed ledger information of the blockchain, and in response to analyzing the plurality of input addresses, (i) group, by using a multi-input heuristic algorithm for the specific cryptocurrency, public addresses included in a single transaction among the plurality of transactions as addresses of a same owner or (ii) group, by using the multi-input heuristic algorithm, public addresses in a plurality of address groups included in multiple transactions among the plurality of transactions as addresses of a same owner when each of the plurality of address groups includes a common address, wherein the cryptocurrency network graph is displayed on a plurality of layers classified according to different types of cryptocurrency, and the knowledge graph is displayed on a plurality of layers belonging to different categories, and wherein the multi-layer based transaction analysis knowledge graph has a multi-layer structure in which nodes of the cryptocurrency network graph and the knowledge graph are mapped to each other.

11. The electronic device according to claim 10, wherein the processor is further configured to execute the instructions to standardize blockchain data including the distributed ledger information and the cryptocurrency address group information analyzed.

12. The electronic device according to claim 10, wherein the processor is further configured to execute the instructions to group the cryptocurrency address using an address change heuristic algorithm for grouping a plurality of addresses presumed to be of the same owner by using an address to which a balance is returned after remittance.

13. The electronic device according to claim 10, wherein the processor is further configured to execute the instructions to:

collect the multi-type data related to the cryptocurrency transaction on the dark web or surface web; and classify the multi-type data according to transaction attributes or data sources; and extract at least one of a cryptocurrency address, transaction information, content type, and user information from the multi-type data; and standardize the extracted information according to a preset criterion.

14. A non-transitory computer-readable medium containing instructions, when executed by a processor, cause the processor to perform a method according to claim 1.

15. The method according to claim 1, wherein the multi-type data are collected based on hyperlinks, seed information, uniform resource locators (URLs), hashtags, and/or keywords.

16. The method according to claim 1, further comprising classifying the multi-type data according to transaction attributes or data sources.

17. The method according to claim 16, further comprising extracting and standardizing information from the multi-type data, wherein the information comprises at least one of a cryptocurrency address, transaction information, content type, or user information.

* * * * *